United States Patent [19]

Foster et al.

[11] Patent Number: 5,145,306

[45] Date of Patent: Sep. 8, 1992

[54] METHOD AND APPARATUS FOR HANDLING CONFECTIONS

[75] Inventors: James P. Foster, Lebanon; C. Thomas Mullen, Hummelstown; Bruce A. Rambacher, East Earl; Herman P. Rhoads, Elizabethtown; Larry R. Fittery, Newmanstown; Michael C. Schiavone, Jr., Lancaster, all of Pa.

[73] Assignee: Hershey Corp., Hershey, Pa.

[21] Appl. No.: 619,892

[22] Filed: Nov. 28, 1990

[51] Int. Cl.⁵ .............................. B65G 65/04
[52] U.S. Cl. .................... 414/417; 198/399; 198/436; 198/635; 198/809
[58] Field of Search .............. 198/399, 402, 436, 437, 198/442, 459, 463.4, 608, 610–612, 620, 629, 635, 836.1, 809; 414/403, 417, 418

[56] References Cited

U.S. PATENT DOCUMENTS

| 2,215,702 | 9/1940 | Holm | 198/442 |
|---|---|---|---|
| 2,597,271 | 5/1952 | Williams | 198/635 |
| 3,737,019 | 6/1973 | Coleman et al. | 198/459 X |
| 3,955,665 | 5/1976 | Pettis, Jr. et al. | 198/809 X |
| 4,598,619 | 7/1986 | Leeper et al. | |
| 4,645,404 | 2/1987 | Juravic | 198/635 X |
| 4,657,466 | 4/1987 | Leeper et al. | |
| 4,755,096 | 7/1988 | Leeper et al. | |
| 4,799,613 | 1/1989 | Adamson | 198/399 X |
| 4,869,360 | 9/1989 | Brown et al. | 198/463.4 X |
| 4,874,079 | 10/1989 | Frenkel et al. | 198/436 |

Primary Examiner—D. Glenn Dayoan
Assistant Examiner—Tuan N. Nguyen
Attorney, Agent, or Firm—Paul & Paul

[57] ABSTRACT

A method and apparatus is provided, for separating articles from product boards and transporting the product articles to another processing station or packaging area. Because of the sticky nature of confections which may be handled the product must be scraped from a product board. Articles are separated from product boards on which they rest upon encountering a blade member which acts to wedge the product from a board surface. The boards are ejected from the machine for reuse, while product or confections are moved downstream along a belt take-up transport conveyor for deposit onto product delivery conveyor, whereby product orientation may be accomplished.

56 Claims, 6 Drawing Sheets

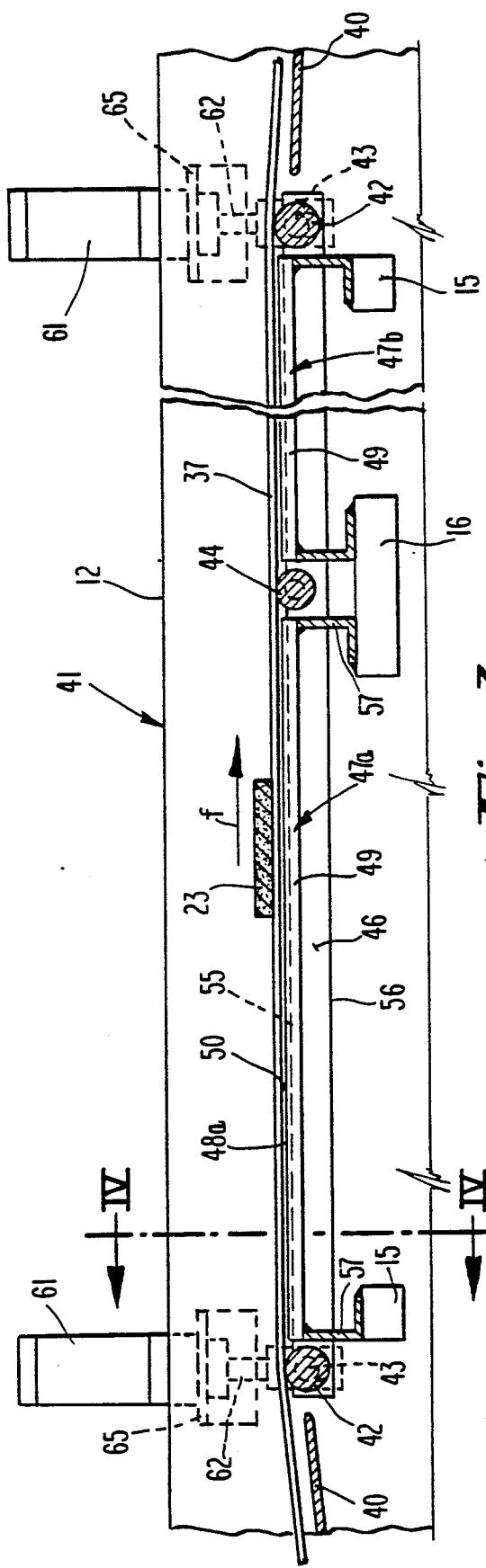
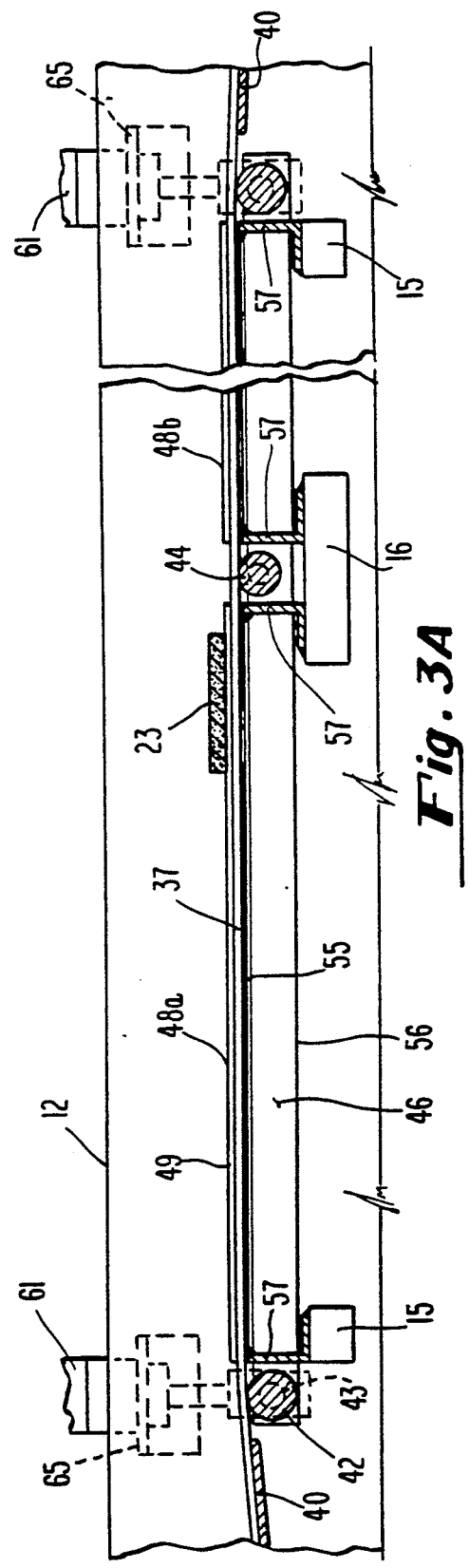
Fig. 3
Fig. 3A

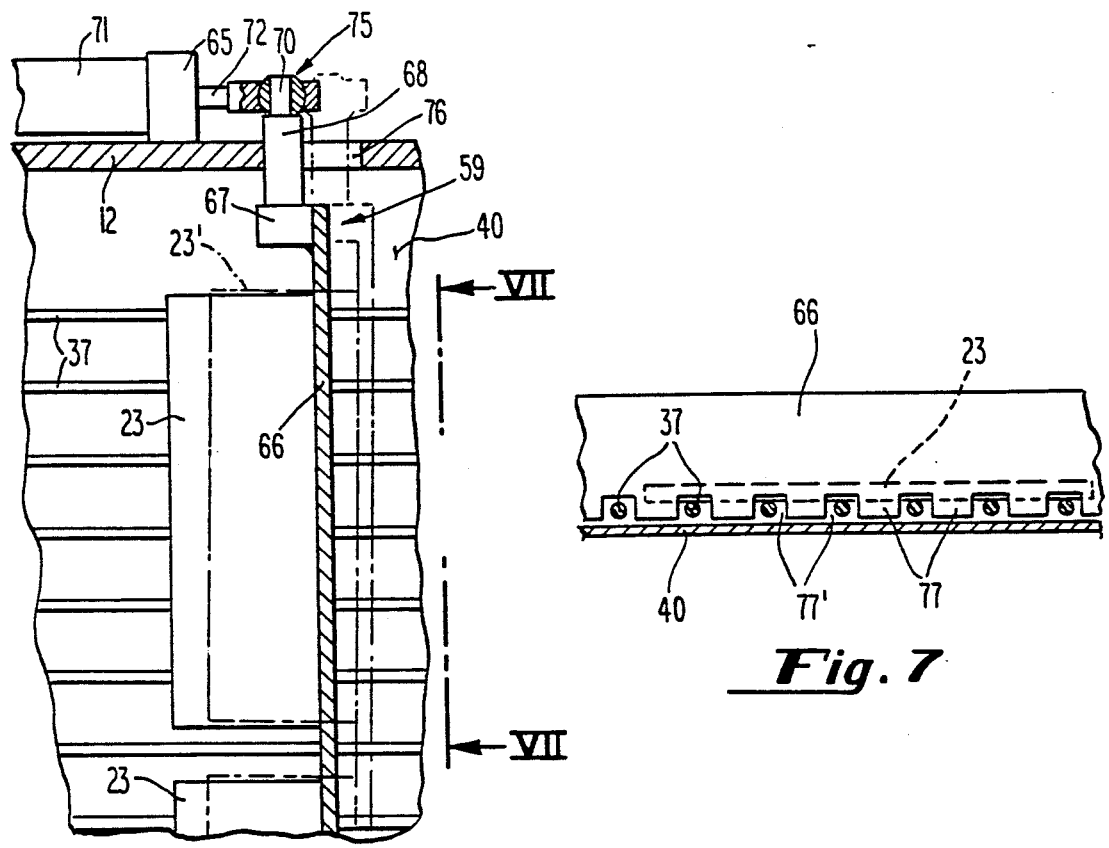
*Fig. 6*
*Fig. 7*
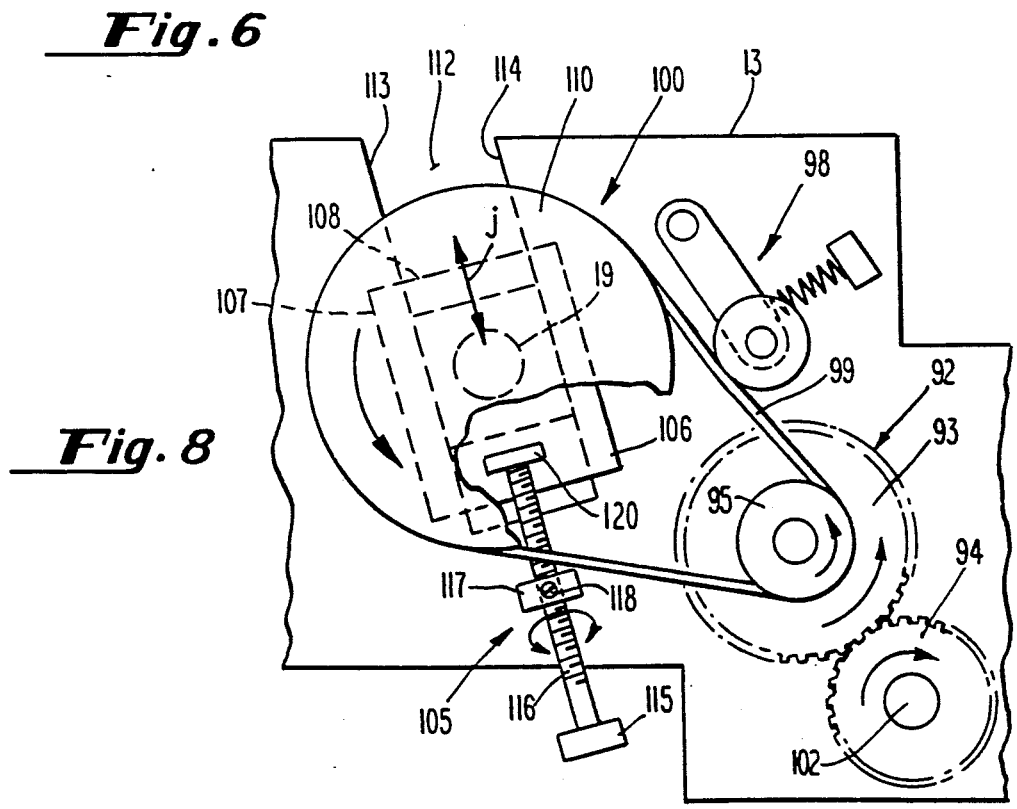
*Fig. 8*

METHOD AND APPARATUS FOR HANDLING CONFECTIONS

BACKGROUND OF THE INVENTION

This invention relates to an apparatus and process for handling confections, such as but not limited to licorice and more particularly, for the removal of such articles from product boards, and the further handling of the confections preparatory to packaging the confections.

Licorice strips are made from a mix which includes among its ingredients flour, water, sugar and flavoring. Due largely to the presence in the mix of a substantial quantity of sugar, as the extruded licorice strips pass through the dryer they can become tacky and tend to stick to the board on which they are being transported. After confections are formed or extruded, they are then set aside for hardening or drying, as the case may be. Such products are supported on boards so that a number of product items may be set aside to cool or dry while additional products can be manufactured without a prolonged need to wait until the preceding products have set. The sometimes sticky product must then be scraped off of the boards in order to be packaged or to undergo additional processing.

Apparatus for removal of licorice from product boards is shown in U.S. Pat. Nos. 4,657,466 and 4,755,096, revealing, inter alia, a spatula blade member for wedging product from a board. These inventions, however, relate to the handling of licorice slabs or strips from which licorice bites are cut. In the prior art sticky licorice bars intended for consumer markets have been manually lifted off of a board to achieve separation.

It is an object of the present invention to provide a novel method and apparatus which separates product items including rows of licorice strips from holding boards.

It is a further object of the invention to accomplish the above object whereby providing the capability to handle a continuous feed of product-containing boards and removal of separated product items, as well as the expulsion of boards from the machine.

It is a further object of this invention to provide a method and means which permits products to be staged for inspection at anytime during the process, with the capability of restoring full continuity of operation when processing is resumed.

It is another object of this invention to provide an apparatus which has means for and a method of alternating product orientation upon delivery of product to a product transport conveyor.

A further object of this invention is to provide a novel process and apparatus for separating and transporting product articles from a product board.

Other objects and advantages of the present invention will be readily apparent to those skilled in the art from a reading of the following brief descriptions of the drawings, detailed description of the preferred embodiment and the appended claims.

SUMMARY OF THE INVENTION

In accordance with the principles of the present invention, a process and apparatus for product handling is provided with novel means for separating product items from a product board and transporting the products to a packaging or other processing destination, such products including but not being limited to tacky materials such as licorice.

Product Handling Operation

More particularly, a frame is provided having a plurality of supporting members and table means for accommodating product and mechanical components thereon, and a pair of frame walls running the length of the frame. Driving means, such as, but not limited to, motors, gears, or belts may be housed on any of the plurality of frame supports for operating any of the conveyor members. The frame is provided with a first product transport means having conveyor means, for receiving and transporting product-containing boards downstream therefrom, into, and through the skiving section, where product is wedged from its product board. A second product transport means is provided for accommodating and delivering the liberated product to a third product conveyor means.

Boards containing a plurality of product rows are received on the first product transport conveyor and from there are moved into the skiving section. The cylindrical skiving drum, fitted with a grooved surface, and being preferably comprised of nylon or other suitable food-grade material, rotates, and while doing so, grips the product articles between a product board and the groove edges, thereby advancing the product over a skiving blade surface. The product board continues advancing forward on the conveyor and passes under the skiving blade while the product is moved across the skiving blade surface and is thereby removed from the product board. Each board will contain a plurality of product rows when loaded on the first product transport conveyor. When the last product row on a board has been removed, the board will then pass completely under the skiving blade edge and drop down onto another conveyor, whereupon the board will be ejected from the product handling machine for re-use. Upon passing between the drum and skiving blade, a plurality of conveyor belts of a second product transport means, which may be of an O-ring type belt, travel in proximate relation to the skiving blade so as to pick up the product for downstream transport in a direction away from the skiving blade.

The O-ring belts span at one end from a roller member adjacent to the downstream end of the skiving blade, and over a series of supporting rods and the span terminates at a roller member positioned just before the third product transport means. The roller members traverse the frame and at least one may be provided with a plurality of spacing rings. The O-ring belts extend through spaces between said rings. A grid member may be provided under the O-ring belts for receipt of product thereon. Grids are supported on the frame and are disposed between rod or roller members. The product may be stopped at any point as it passes through the machine. The product staging means prevents any movement or shifting of product alignment as would occur upon stopping the belts with the product still remaining thereon. This staging permits the resumption of operations after a stoppage without further interruption or the need to remove product which has not yet completed its route. The staging means comprises at least one grid made preferably of metal or any other materials suitable for support of goods which are to be edibly consumed by purchasers of the product. On either side of the grid are rods mounted to bars which are operated by solenoid valves. When the rods are in the activated position, they are raised to a height so that the O-ring belts which rest upon them are well above the metal grid, thereby allowing movement of product along the O-ring belts. However, when the rods are in the deactivated position these belts remain between the grid slats and are lower than the grid surface, thereby allowing product to rest upon the grid. After passing over the grid prior to exiting the second product transport means, the products while remaining on the O-ring belts come to rest against and are stopped by a gate. Movement of the gate is triggered by a timer such that when a full row of product has accumulated at the gate, passage of product thereunder is permitted.

First, the end of the gate nearest to the product delivery destination is moved forward by a push cylinder to align the row of product in a slightly angled formation. Next a rotary cylinder operates to lift up the gate and the products are moved along the O-ring belts and dispensed onto a third product transport means comprising a dual row of conveyors running parallel to the rods and roller members of the second transport conveyor. Between the conveyor rows of the third product transport means is a flipping mechanism which may, for example, have a wire grid or other suitable flipper surface for supporting product thereon, and which can be operated by a timer-activated rotary cylinder. When in its delivery position, the flipper remains clear of the path of the conveyor closest to the end of the second product transport means, thereby allowing receipt of product on said conveyor. When in its receiving position, however, the flipper covers the same conveyor and product is deposited onto the flipper surface. The flipper then rotates about its axis to deposit the row of product, in inverted form, onto the far conveyor of the third product transport means. The product is then carried from the conveyors to another destination for packaging or further processing.

BRIEF DESCRIPTION OF THE DRAWINGS

FIG. 3 is an enlarged longitudinal sectional view taken through the belt take up and product staging means of FIG. 1, generally along the line III—III of FIG. 1 with the belt take-up means in an activated position.

FIG. 3A is similar to the view of FIG. 3, but, unlike FIG. 3, shows the belt take-up means in the deactivated position.

FIG. 6 is a fragmentary top plan view of portions of the gate assembly, and a section through the gate, and is taken along the line VI—VI of FIG. 5.

FIG. 7 is an enlarged, fragmentary transverse sectional view showing the gate wall taken through a portion of the frame means at a location downstream from said gate assembly, along the line VII—VII of FIG. 6.

FIG. 8 is an enlarged fragmentary side elevation view of the drum adjusting means taken along the line VIII—VIII of FIG. 1.

DETAILED DESCRIPTION OF THE PREFERRED EMBODIMENTS

In accordance with the present invention, a process and apparatus for handling articles such as but not limited to confectionary products is provided for stripping licorice, for example, from a product board onto which it had been extruded or collected when formed. For example, the product on the boards may comprise six rows of licorice bars disposed in parallel relation, with eight bars making up a row (see FIG. 1). The strips are sometimes tacky and tend to stick to the board.

Figure 1:
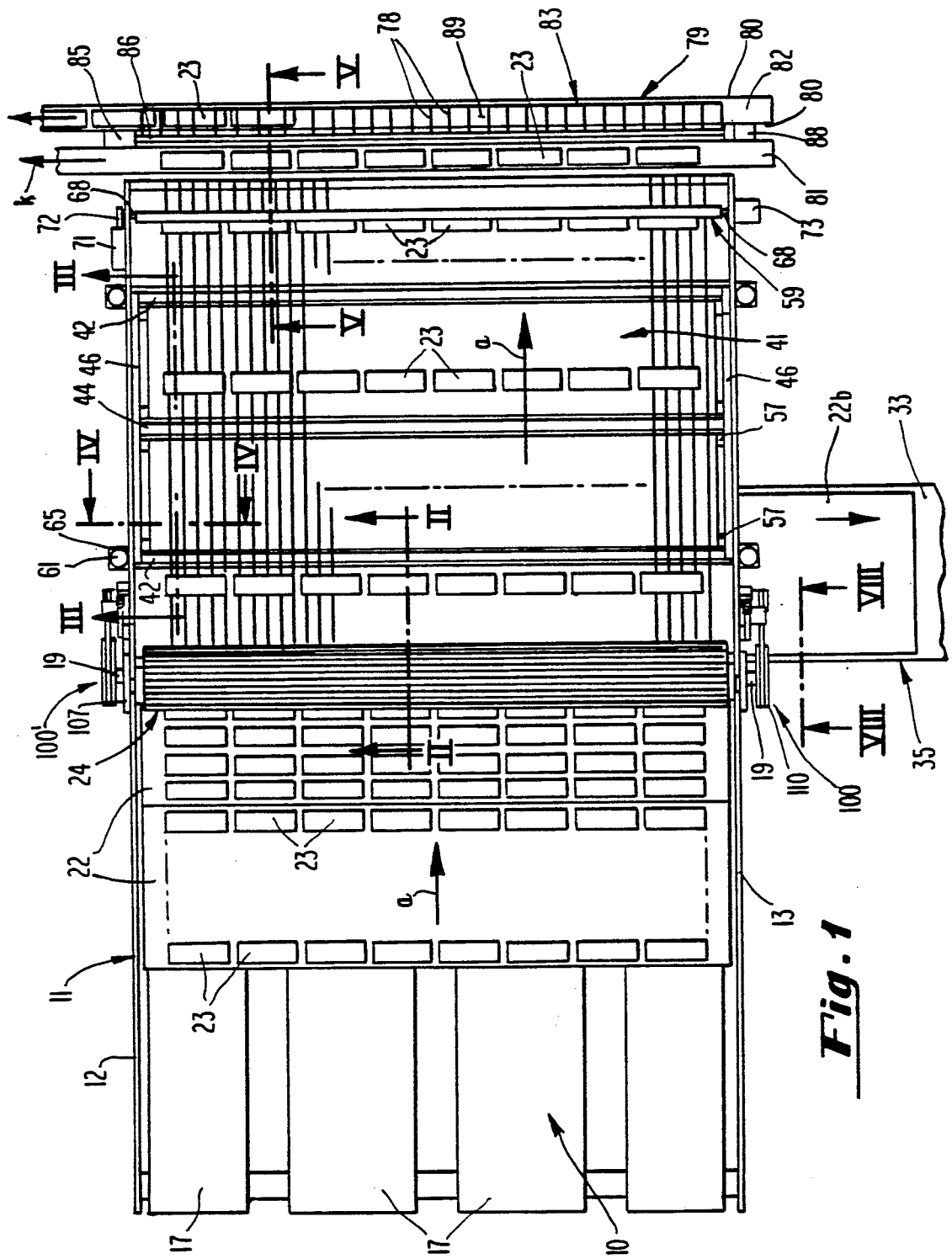
FIG. 1 is a top plan view of the product handling apparats, with lettered arrows "a" indicating the longitudinal direction of product and board flow.

The product handling machine illustrated in FIG. 1, comprises a frame means 11 having opposite side walls 12 and 13 and a plurality of suitable horizontal support means such as those 14 (FIG. 2), 15 and 16 (FIG. 3) extending between and connecting walls 12, 13 for accommodating a series of mechanisms thereon. Suitable apertures such as those 60 (FIG. 4) and 76 (FIG. 6) are also provided through the frame walls 12, 13 for accommodating a variety of components therethrough, for example for connection to air cylinder pistons and movement therethrough, to accommodate shafts and the like. The first product transport means generally designated by the numeral 10 comprises at least one conveyor 17, and preferably more than one conveyor 17 arranged in substantially spaced-apart relation to one another, for operation in a direction parallel to the length of frame walls 12 and 13. The conveyors 17 are operated by a driving means which may be supported on or disposed in adjacent relation to the frame means 11 such that each of the at least one conveyor 17 operates at the same speed as any other conveyor 17. The conveyors 17 preferably may be driven by the drive shaft 102 (FIG. 8) which is itself driven by a motor, gear or pulley arrangement (not shown). The conveyors of the first product transport means 10 receive successive rows of boards 22 containing product 23 thereon, and carry the product-containing boards downstream, the direction of which is indicated by arrow "a" of FIG. 1.

Figure 2:
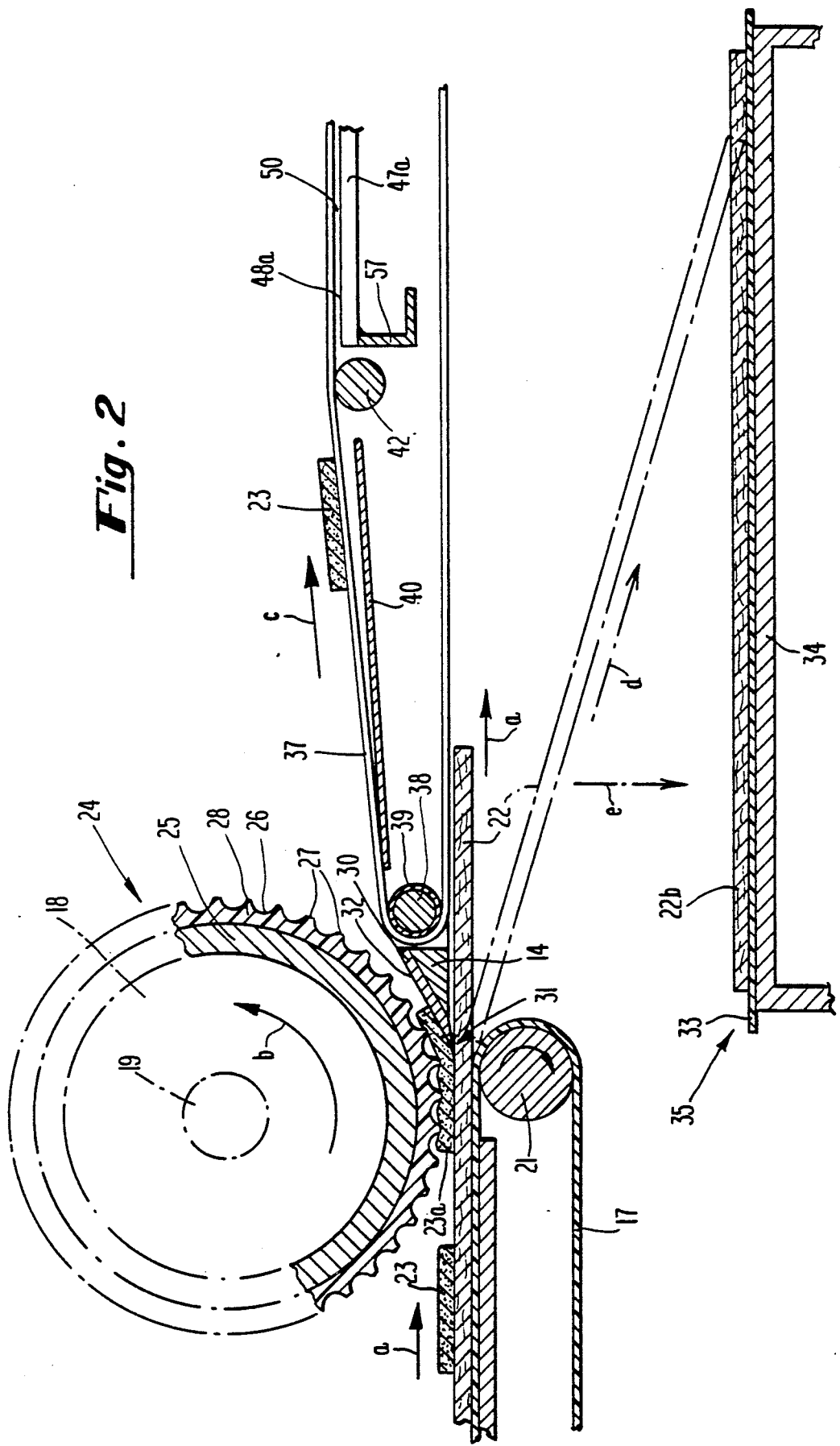
FIG. 2 is an enlarged longitudinal sectional view taken along the line II—II of FIG. 1, showing the product/board separation means, with the board being shown separated in phantom.

A cylindrical drum member 24 is provided being rotatably mounted at opposite sides of frame walls 12 and 13 for vertical movement therein and is more fully described hereinafter. The details of the drum and skiving system are shown in FIG. 2. The skiving drum 24 comprises a cylindrical roller 25 being of preferably hollow construction and made of a light rigid material such as, but not limited to, aluminum. The ends of the drum may be fitted with caps 18 for receiving a shaft 19 therethrough. The shaft may extend through the entire length of the drum or optionally may be mounted on each drum end cap 18.

The outer circumference of the cylindrical roller member 25 is fitted with an outer covering 28 preferably constructed from a nylon or other lightweight material suitable for contacting use with food products. A plurality of grooves 26 are provided in the outer cylindrical covering 28, and run axially across the width of the drum member 24. The grooves 26 are defined by a plurality of spaced-apart protrusions 27 therebetween which allow for gripping of the product 23a between the drum member 24 and a product board 22 and moving said product across the surface of a skiving blade 30. The conveyor 17 of the first product transport means 10 carries a board 22 downstream, while at the same time the drum member 24 is operated by a driving means which is detailed more particularly in FIG. 7, to provide counterclockwise rotation as indicated by arrow "b" in FIG. 2.

Protrusions 27 act to compress the product against the product board and thereby prevent any undesirable shifting or slippage of product as it is moved toward the skiving blade 30. The skiving blade 30 is mounted to frame support means 14 in substantial acute angular relation with conveyor member 17 thereby forming a wedge.

The product board 22 and product contained thereon 23 move forward by operation of the drum 24 and the conveyor 17 of the first product transport means 10, whereupon separation of product 23a from a product board 22 is accomplished upon the product's encounter with the skiving blade 30. As a product board 22 is transported downstream, the product 23a, after reaching the skiving blade edge 31, continues to move forwardly over the skiving blade surface 32 due to the rotation of the drum 24 and the gripping action provided by the drum protrusions 27. The product board continues to move under the skiving blade until reaching the end of the first product transport conveyor(s) 17 indicated by a conveyor shaft 21 of the first product transport conveyor means 10. The product board 22 being supported only on one end by the conveyors 17 of the first transport means, drops down into the phantom position indicated by dashed lines in FIG. 2, so that the downstream end of the now empty product board is being supported by a transverse conveyor 33 of the board ejection transport means generally designated by numeral 35.

When the product board reaches the edge of conveyor 17 and is no longer supported, the board, now free of product, drops down so as to completely rest on the ejection conveyor 33. The conveyor 33 operates in a direction perpendicular to the first product transport conveyor 17 so as to expel the empty board member (at this point in FIG. 2 designated 22b) from the product handling machine for re-use, collection or transport to another area. In FIG. 2 the boards 22b are expelled out of the plane of the paper.

Product is meanwhile moved along the upper surface 32 of the skiving blade 30 and passes over the downstream end of the skiving blade whereupon the product is picked up by the belts 37 of a second product transport means generally designated by numeral 41. The second product transport means 41 carries the skived product downstream to a third product transport means generally designated by numeral 79.

A roller member 38 is provided at each end of the second product transport means 41. The roller member 38 may be solid or can be fitted with an outer cylindrical sheath 39 for rotation with the roller member 38. Each roller member 38 is positioned at a height such that its uppermost position as shown in FIG. 2, (including any sheath disposed thereon), is no higher than the upper edge of any of the leg members 57 which support grid slats 49 of a grid member 47a or 47b (hereinafter described in detail) of the second product transport means 41. The rollers 38, therefore, are positioned at a height lower than any of the belt supporting rods 42 to assure that in the deactivated condition (FIG. 3a) the belts 37 remain in spaces 51.

Figure 4:
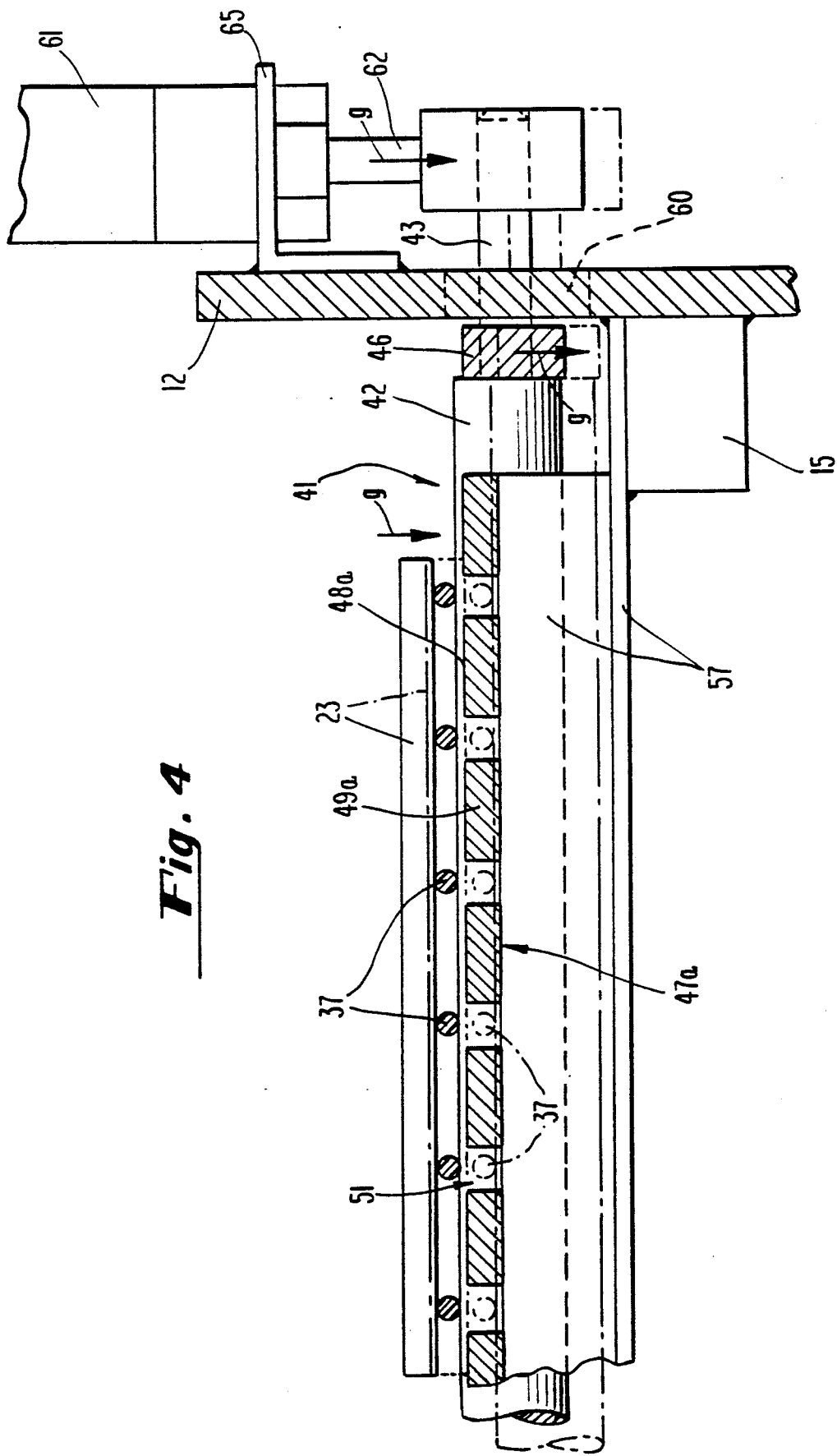
FIG. 4 is an enlarged fragmentary transverse sectional view taken through the belt and belt take-up means of FIG. 3, generally along the line IV—IV of FIG. 3.

FIG. 3 is a view showing the continuation of the second product transport means 41 of FIG. 2. In FIG. 3, O-ring transport belts 37, for example, are shown in their activated position, as indicated by an O-ring belt member 37 positioned above the surface 48a or 48b of a grid member 47a or 47b separated by a space 50 therebetween. O-ring belts are supported by rod members 42 (both ends) and 44 which traverse the width of the frame means 11 within walls 12, 13. The rod members 42, 44 at opposite ends thereof are mounted to bar members 46 (FIG. 1), with each bar defined by an upper edge 55 and a lower edge 56 (FIG. 3). A pair of identical multi-slat stationary grid members 47a and 47b are provided upstream and downstream of rod member 44, respectively, with grid surfaces 48a and 48b for staging product thereon, across multiple slats 49 thereof, the operation of which is shown in FIGS. 3, 3a and 4. Grid member 47a, for example, is provided with legs 57 which rest on frame shelf supporting members 15 and 16 and support slats 49. Grid members 47a and 47b are disposed in the area defined between bar members 46 (FIG. 1) and rod members 42 (FIG. 3). The belts 37, rods 42, 44 and bars 46 of the second product transport means 41, are therefore vertically movable relative to the stationary grid members 47a and 47b, between the two positions of FIGS. 3 and 3a. Alternatively, (not shown) grid members 47a and 47b may be provided being vertically movable in relation to belt members 37, with the belts remaining stationary.

FIG. 3a represents the same view as FIG. 3 but shows the O-ring support rod members 42 and 44 in a deactivated, lowered position, with product 23 resting on upper grid member surface 48a. For lowering and raising the belts 37, rods 42, 44 and bars 46, air cylinders 61 are mounted on frame walls 12, 13 at each end of the rod-supporting bar member 46 which in turn are carried by pistons 62 of the air cylinders 61.

Each cylinder 61 may be mounted to a frame wall 12 or 13 by a mounting bracket 65, for example, or any other suitable mounting means. The cylinders are preferably operated by at least one solenoid (not shown), with the preferred arrangement providing a solenoid for each pair of cylinders located on opposite ends of rods 42. Extending from rods 42 are pins 43 which pass through apertures 60 (shown in FIG. 4) of the vertical slot type in frame walls 12 and 13, each pin 43 being carried by the piston 62 of an air cylinder 61 for vertical movement therewith. In FIG. 4, the second product transport means 41 is shown in full lines in its activated position, and in phantom lines in its deactivated position. Deactivation is achieved when the pistons 62 of the air cylinders 61 are moved downward, in the direction of arrow "g" thereby lowering the rod supporting bar 46 and belt supporting rods 42 and 44 connected thereto. The belts 37 are thus lowered along with the rods and are positioned between grid slats in spaces 51 below the grid member surface 48a or 48b of grids 47a or 47b, as shown by the phantom positions of the belts. The spaces must be of a depth at least as great as the belt thickness in order to allow product to rest on a grid surface in the deactivated condition. This belt retracting transition allows for operator-selective stoppage of product at any time during transport and is preferably synchronized with the shut-off of the driving means operating the belt members of the second transport means 41, and may be synchronized with other conveyor drive means as well, such as that for product transport means 10 and/or that for the drum 24. Product resting on the grid member surfaces 48a, 48b upon deactivation may be subject to resumed transport upon reactivation of the supporting rods 42 by the operation of the air cylinders 61, thereby preserving the alignment of product rows in that product misalignment might otherwise occur if the belts were to be stopped while they were carrying the product.

Figure 5:
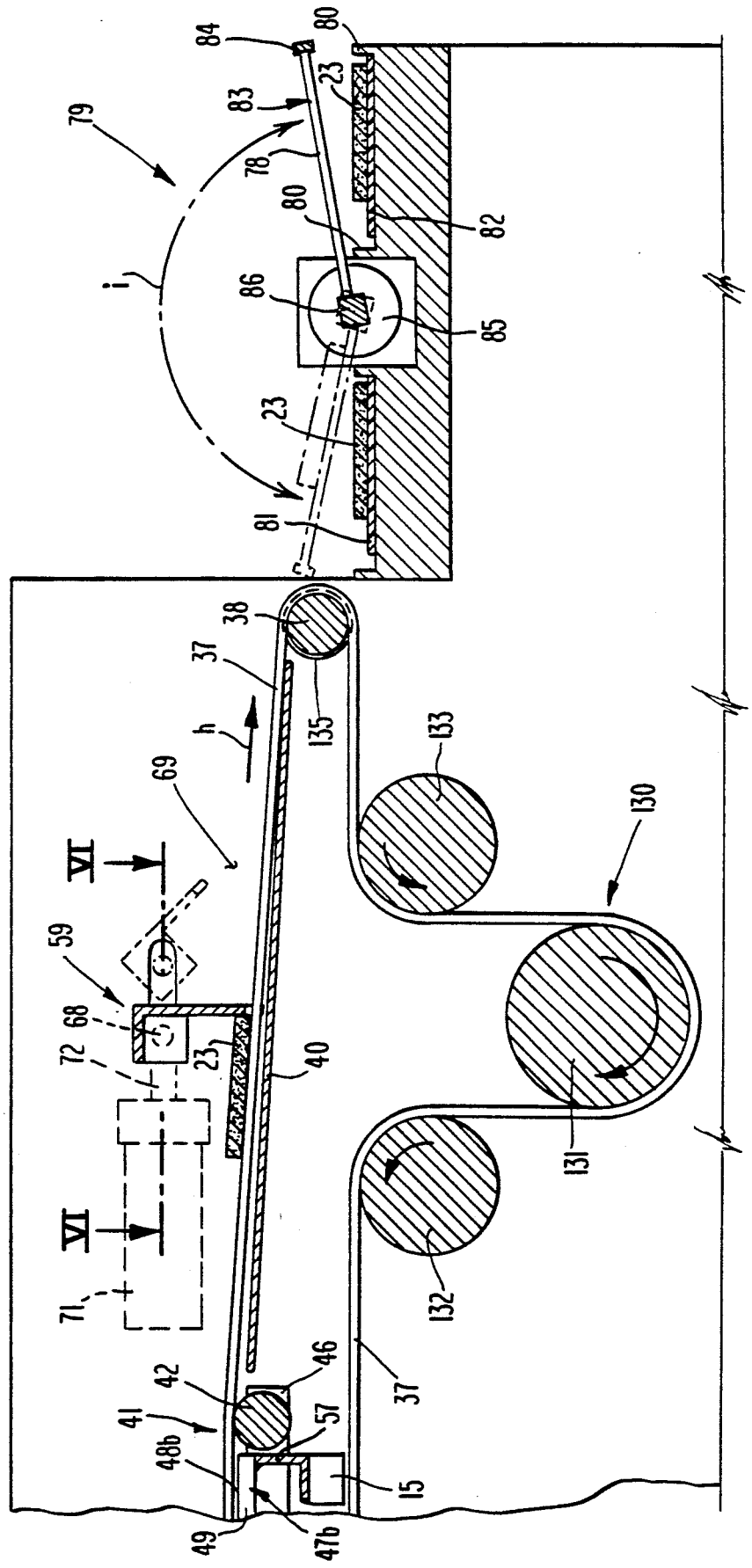
FIG. 5 is an enlarged fragmentary longitudinal sectional view of the gate and flipper assemblies taken along the line V—V of FIG. 1.

In FIGS. 5 and 6, the downstream end of the second product transport conveyor means 41 is shown as a continuation of FIGS. 3 and 3a. The product hold-back gate means 59 is shown comprising gate wall 66, gate arm 67, and gate arm pin 68 with gate arm pin extension 70. The gate arm pin 68 and pin extension 70 extend through an aperture 76 in the frame wall 12 with the pin being pivotally connected to a piston 72 of an air cylinder 71 via the universal joint 75 shown in FIG. 6. Product 23 is shown resting against the gate wall 66. The air cylinder operates to push the gate wall forward at the one end only, shown in FIG. 6, radially pivoting about the opposite gate end joint.

Thereafter, a rotary cylinder 73, shown in FIG. 1, which may be controlled by a timer or photo-electric sensor, operates to rotate the gate assembly to the phantom position therefor shown in FIG. 5, with gate wall 66 being in a raised position allowing for the passage of product thereunder, as at 69. Product once moving under the gate wall 66, continues to be carried downstream along transport belts 37 in the direction of arrow "h", whereupon said product is transferred from the second product transport means 41 to one of at least two conveyors 81 and 82 of a third product transport means 79.

The third product transport means comprises a dual row of conveyors including a near conveyor 81 and a far conveyor 82, each seated between a pair of retaining walls such as those 80. A flipper arm 83 spanning the width of the frame at least between walls 12, 13 is pivotally connected to a bearing 88 at one arm end and to a rotary cylinder 85 at the other flipper arm end for reciprocal rotation about the flipper arm axis 86, in the directions indicated by the double-headed arrow "i". The flipper arm 83 includes means such as, but not limited to, a wire grid 78 with rectangular openings 89 (FIG. 1) or the same could be a flat surface, like a shelf (not shown) for supporting product thereon. A retaining edge 84 for the grid 78 is provided along the outer perimeter of the flipper arm 83 for preventing any inadvertent slippage of product off the radially outermost edge of said flipper arm by centrifugal force during flipping.

Product may be transported from the transport belts 37 of the second transport means 41 for disposal directly onto the near conveyor 81 of the third product transport means 79 when the flipper arm is in its full line delivery position as seen in FIG. 5. Product emanating from transport belts 37 may alternatively be delivered to the far conveyor 82 of the third product transport means 79 as shown by the phantom lines of the flipper arm in FIG. 5, seen in the product-receiving position. This is accomplished by the receipt of product onto the grid 78 of the flipper arm (the phantom position), whereby rotational movement of said arm in a clockwise direction indicated by arrow "i" will transfer product to the far conveyor 82, reversing the product's orientation, so that a product face up on the transport belts 37 is face down after delivery onto far conveyor 82.

The product is then carried off by the transport conveyors 81 and 82 where it is delivered to another area for packaging, further processing, etc.

FIG. 6 is a top view of the gate assembly showing the details of gate movement and rotation between full line and phantom positions. The air cylinder 71 is mounted to the frame wall 12 by a mounting member 65 with spare space or aperture 76 provided in the frame wall 12 being sufficient to allow forward movement of the gate arm pin 68 therein between the full line and phantom positions shown. The phantom position shown in FIG. 6 indicates the downstream but pre-pivot position of the gate assembly 59 prior to product passage thereunder. The gate assembly 59 has, in phantom, moved forward at one end to allow for angular orientation of a product row resting thereagainst as shown at 23'. Thereafter, at the opposite end of the gate assembly a rotary cylinder 73 (FIG. 1) is activated to provide pivotal movement of the gate about its axis as indicated by the phantom gate wall position of FIG. 5 to allow the space 69 therebeneath. The product's angular alignment before pivoting of the gate to allow product flow thereunder, will assure that the products 23 closest to wall 12 will proceed downstream slightly ahead of the next adjacent product that is closer to wall 13. This prevents overlap of adjacent products 23 once they are deposited on one of the conveyors 81 or 82 as those conveyors deliver product 23 into the plane of the drawing of FIG. 5, in the direction of arrow "k" in FIG. 1.

With reference to FIG. 7 there is shown a view looking at the front of the gate wall. A plurality of gate tabs 77 are provided being separated by spaces 77' to accommodate the passage of transport belts 37 therebetween with the product 23 shown resting against the gate wall.

FIG. 8 best shows the detail of the skiving drum drive assembly generally designated by numeral 100. It is noted that the drive assembly 100' of FIG. 1 is the mirror image of drive assembly 100, shown with more particular detail in FIG. 8. Although shown only in FIG. 1, drive assembly 100' operates consistent with the assembly 100 shown in FIG. 8, and any pertinent descriptions relating to assembly 100 also apply to assembly 100'. Frame walls 12 and 13 are provided with angularly disposed grooves 112 defined by groove edges 113 and 114. A mounting seat 106 is provided therein for sliding upward and downward in grooves 112 as shown by arrow "j".

The speed step-down drive assembly 100 is provided for rotating the drum member 24 from the shaft 102 of a motor (not shown) and may comprise drive belt 99, gears 93, 94, and pulleys 95 and 110, as shown in FIG. 8. This provides a conventional speed step-down with torque step-up from a motor to the rotatably driven drum 24. The shaft 102 may preferably transversely extend the width of the frame 11 to drive gear 94 and its mirror image counterpart (not shown) of drive assembly 100'.

The drum 24 is shaft-mounted at 19 in the slideable mounting seat 106 with the end of the mounting shaft 19 carrying the pulley 110 driven as aforesaid. The slideable seat 106 comprises a pair of mounting plates 107 on opposite sides of the wall 13, connected by a bearing block 108 for carrying shaft 19. Both ends of the drum shaft 19 are similarly mounted on walls 12, 13, for angular vertical movement of the drum axis as shown by the direction of arrow "j", resulting from the displacement of the seat 106 housing the shaft 19 of the drum cylinder 24. Thus a thicker product 23 or board 22 is able to move the drum 24 vertically to accommodate its thickness.

A tension regulator 98 is also provided, comprising a conventional mounting arm, idler wheel and tension spring as shown in FIG. 8.

Various thicknesses of product material and boards may also be handled by adjusting the drum height to adequately accommodate for the passage of product and board thereunder. An adjustment means 105 is provided, comprising an adjustment knob 115, for manually turning shaft 116, connected thereto and threaded into a threaded receiver 117 fixedly carried on wall 13. A set screw 118 locks and unlocks the adjustment means 105 in any given position. A roller adjustment seat 120 is carried by the outer one of plates 107 of mounting seat 106 to allow for raising and lowering of the drum 24 relative to the upper plane of the conveyor 17 of the first product transport means 10. Once the adjustment mechanisms 105 on each end of shaft 19 on walls 12, 13 are set to the desired height, the set screws 118 are tightened to fix the drum position.

In FIG. 5, there is also shown a drive and tensioning mechanism 130 for the O-ring belts of the second product transport means 41. A shaft 131 in contact with the O-ring belts 37, is rotated by a drive means (not shown).

Supporting idler shafts 132 and 133 are also provided for belt tension regulation upon their adjustment by suitable mechanisms (not shown). The rods 131, 132, and 133 span the width of the frame and are rotatably supported on the frame 11, at their ends. The roller member 38 provided at the end of the second product transport means for accommodating O-ring belts thereover, spans the width of the frame between walls 12, 13 and, for example, may contain a plurality of substantially transversely spaced-apart rings 135 disposed thereon for allowing separation of O-ring belts therebetween.

It will be apparent from the foregoing that various materials other than licorice may be handled by the apparatus of the present invention, and that various modifications may be made in the spirit and scope of the invention as defined in the appended claims.

It will be further apparent from the detailed description of the drawings and the figures that modifications in the drive assemblies for transport means may comprise a wide array of mechanisms. For example, any of the conveyors shown in the figures may be either belt-driven, gear-driven, or directly driven by a motor. Any rod of such assemblies may be solid or hollow and may, for example, be either rotatably mounted or fixedly mounted with a rotatable roller sheath thereon.

Drive means shown in FIG. 8, for example, may comprise alternative arrangements other than the gears, belts and pulleys indicated therein. For example, the drum may be directly driven by a motor mounted to the shaft. Additionally, an alternative arrangement of gears may be provided for rotatably driving the drum member. Other pulley arrangements in addition to the one pictured in FIG. 8 utilizing step-down pulleys or other combinations of belts and pulleys may also be employed to operate the drum. The shaft arrangement in FIG. 5 providing for belt tension regulation and driving may comprise alternative arrangements consistent with the aforementioned with respect to FIG. 8.

It is also noted that a wide variety of conveyors of different structure and configuration other than than represented in the drawings may be employed equally as well in any of the transport systems.

What is claimed is:

1. In an apparatus for handling food products that are provided arranged on boards in which a plurality of the products are to be separated from the boards and subsequently arranged in a predetermined manner;

(a) first transport means for receiving boards having a plurality of food products thereon that are arranged transverse of the apparatus and in longitudinally serial rows of product, and for serially conveying the boards longitudinally of the apparatus to a separation zone;

(b) a product separation zone including means for engaging a plurality of products transversely of the apparatus and separating the products from the boards; and (c) second transport means for receiving products from said separation zone, such that a plurality of products are arranged transverse of the apparatus and in serial transverse rows of product longitudinally of the apparatus, for serially conveying transverse rows of product longitudinally of the apparatus; and (d) wherein the means for engaging and separating products from the boards comprises a transverse roller for engaging the products and a blade for scraping the products from the board while the products are directly engaged by the roller, said roller being disposed a distance from said blade to define a space therebetween through which said engaged products travel in contacting relation to said roller.

2. The apparatus of claim 1, wherein said roller includes product gripping means on a peripheral surface thereof.

3. The apparatus of claim 1, including means mounting the roller at ends thereof and mean for adjusting the relative spacing of the roller and blade.

4. The apparatus of claim 3, wherein said mounting means include guide means for guiding the ends of the roller upon adjustment of the relative spacing.

5. The apparatus of claim 1, wherein said blade is sloped to cam products that are separated from the board, in an upward direction.

6. The apparatus of any one of claims 1 or 2, wherein said second transport means comprise a plurality of continuous band members.

7. The apparatus of any one of claims 1 or 2, including means for discontinuing longitudinal movement of product on said second transport means.

8. The apparatus of claim 7, wherein said means for discontinuing longitudinal movement include product resting table means and a plurality of continuous bands mounted for movement through said resting table means, and including means for selectively raising or lowering one of the bands and table relative to the other of the bands and table.

9. The apparatus of claim 8, wherein the bands are mounted by longitudinally spaced apart roller members, and including drive means for driving the bands in conveyor-like fashion.

10. The apparatus of any one of claims 1 or 2, including an openable alignment gate means disposed transverse of the apparatus for engaging products thereagainst and aligning the products.

11. The apparatus of claim 10, including means for moving one end of the alignment gate means to be disposed more downstream of the apparatus than the other end of the gate means, whereby products disposed thereagainst are slightly angularly aligned transverse of the apparatus.

12. The apparatus of claim 10, including means for pivotally opening the alignment gate means.

13. The apparatus of any one of claims 1 or 2, including means for selectively re-orienting product between face-up and face-down positions.

14. The apparatus of claim 13, wherein said means for selectively re-orienting product is located downstream of said second transport means.

15. The apparatus of claim 13, wherein said means for selectively re-orienting product includes flipper means transverse of said second transport means, for engaging all products in a transverse row selected by said means for reorienting product and flipping those products from face-up to face-down positions or the converse.

16. The apparatus of any one of claims 1 or 2, including a pair of transverse conveyors longitudinally downstream of said second transport means, disposed for conveying rows of products transverse to the longitudinal direction of product movement through the second transport means.

17. The apparatus of any one of claims 1 or 2, including means for ejecting from the apparatus, boards from which products have been removed.

18. The apparatus of claim 17, wherein said means for ejecting include transversely disposed board conveyor means.

19. The apparatus of claim 17, wherein said transversely disposed board conveyor means is disposed below said second transport means.

20. In an apparatus for handling food products that are provided arranged on boards in which a plurality of the products are to be separated from the boards;
   (a) transport means for receiving boards having a plurality of food products thereon that are arranged transverse of the apparatus and in longitudinally serial rows of product, and for serially conveying the boards longitudinally of the apparatus to a separation zone;
   (b) a product separation zone including means for engaging a plurality of products transversely of the apparatus and separating the products from the boards;
   (c) wherein the means for engaging and separating products from the boards comprises a transverse roller for directly engaging the products and a blade for scraping the products from the board while the products are directly engaged by the roller; and
   (d) wherein said roller includes product gripping means on a peripheral surface thereof.

21. The apparatus of claim 20, including means mounting the roller at ends thereof and means for adjusting the relative spacing of the roller and blade.

22. The apparatus of claim 21, wherein said mounting means include guide means for guiding the ends of the roller upon adjustment of the relative spacing.

23. In a method of handling food products that are provided arranged on boards in which a plurality of the products are to be separated from the boards and subsequently arranged in a predetermined manner, the steps of:
   (a) transporting boards having a plurality of food products thereon that are arranged transverse of the longitudinal direction of product being transported, and in longitudinally serial rows of product, and serially conveying the boards longitudinally of the apparatus to a separation zone;
   (b) engaging a plurality of products transversely of the apparatus in a separation zone and separating the products from the boards within the zone;
   (c) receiving and transporting products from the separation zone, such that a plurality of products are arranged transverse of the direction of being transported and in longitudinally serial rows of product in the direction in which the products are being transported, and serially conveying transverse rows of product longitudinally; and
   (d) wherein the engaging and separation of products from the boards includes the steps of directly engaging the products with a transverse roller and scraping the products from the board with a blade while the products are directly engaged by the roller.

24. The method of claim 23, wherein the engaging step includes gripping the products with a peripheral surface of the roller.

25. The method of claim 23, wherein the roller is provided mounted at its ends, and including the step of adjusting the relative spacing of the roller and blade.

26. The method of claim 25, including the step of guiding the ends of the roller upon adjustment of the relative spacing.

27. The method of claim 23, including the step of camming products that are separated from the board in an upward direction over a sloped portion of the blade.

28. The method of any one of claims 23 or 24, wherein the step of receiving and transporting products includes engaging the products with a plurality of continuous band members and conveying them longitudinally.

29. The method of any one of claims 23 or 24, including the step of discontinuing longitudinal movement of product during the receiving and transporting step.

30. The method of claim 29, wherein the step of discontinuing longitudinal movement further includes stopping the motion of a plurality of continuous bands that are mounted for movement through a resting table, and resting the products on the resting table in conjunction with selectively raising or lowering one of the bands and table relative to the other of the bands and table.

31. The method of claim 30, including the step of driving bands which are mounted by longitudinally spaced apart roller members, in conveyor-like fashion.

32. The method of any one of claims 23 or 24, including aligning and engaging products against an openable alignment gate disposed transverse of the direction of transporting products.

33. The method of claim 32, including the steps of moving one end of the alignment gate to be disposed more downstream of the path of transporting products than the other end of the gate, and aligning products disposed thereagainst slightly angularly and transverse of the direction of transporting products.

34. The method of claim 32, including the step of pivotally opening the alignment gate.

35. The method of any one of claims 23 or 24, including the step of selectively re-orienting products between face-up and face-down positions.

36. The method of claim 35, wherein the selectively reorienting of product takes place following the step of receiving and transporting products from the separation zone.

37. The method of claim 35, wherein the step of selectively re-orienting products includes the steps of engaging all products in a selected transverse row and flipping those products from face-up to face-down positions or the converse.

38. The method of any one of claims 23 or 24, including the steps of conveying rows of products transverse to the longitudinal direction of product movement during the receiving and transporting step, along a pair of transverse conveyors, following the receiving and transporting step.

39. The method of any one of claims 23 or 24, including the step of ejecting from the apparatus, boards from which products have been removed.

40. The method of claim 39, wherein the ejecting step includes transporting a board along a transversely disposed board conveyor.

41. The method of claim 39, wherein the transversely disposed board conveyor is located below a path of products being transported during the receiving and transporting step.

42. In a method for handling food products that are provided arranged on boards in which a plurality of the products are to be separated from the boards, the steps of:
   (a) transporting boards having a plurality of food products thereon that are arranged transverse of the direction of product travel and in longitudinally serial rows of product, and serially conveying the boards longitudinally of the direction of product travel, to a separation zone;
   (b) engaging a plurality of products transversely of the apparatus and separating the products from the boards within a product separation zone;
   (c) wherein the step of engaging and separating products from the boards comprises directly engaging the products with a transverse roller and scraping the products from the board by means of a blade while the products are directly engaged by the roller; and
   (d) wherein the engaging of the products by a roller includes gripping the products with a peripheral surface of the roller.

43. The method of claim 42, including mounting the roller at its ends and adjusting the relative spacing between the roller and blade.

44. The method of claim 43, including guiding the ends of the roller upon adjustment of the relative spacing.

45. In an apparatus for handling food products that are provided arranged on boards in which a plurality of the products are to be separated from the boards and subsequently arranged in a predetermined manner;
   (a) first transport means for receiving boards having a plurality of food products thereon that are arranged transverse of the apparatus and in longitudinally serial rows of product, and for serially conveying the boards longitudinally of the apparatus to a separation zone;
   (b) a product separation zone including means for engaging a plurality of products transversely of the apparatus and separating the products from the boards; and
   (c) second transport means for receiving products from said separation zone, such that a plurality of products are arranged transverse of the apparatus and in serial transverse rows of product longitudinally of the apparatus, for serially conveying transverse rows of product longitudinally of the apparatus;
   (d) including means for selectively re-orienting product between face-up and face-down positions; and
   (e) wherein the means for selectively re-orienting product includes flipper means transverse of said second transport means, for engaging all products in a transverse row selected by said means for re-orienting product and flipping those products from face-up to face-down positions or the converse; including a pair of transverse conveyors longitudinally downstream of said second transport means, disposed for conveying rows of products transverse to the longitudinal direction of product movement through the second transport means, including means for alternating said flipper means to alternatively allow the rows of products being delivered from said second transport means to be delivered onto the nearest one of the pair of transverse conveyors or to flip a row of products over the nearest one of the pair of transverse conveyors onto a more remote one of the pair of transverse conveyors.

46. The apparatus of claim 45, wherein the means for engaging and separating products from the boards comprises a transverse roller for engaging the products and the blade for scraping the products from the board while the products are engaged by the roller.

47. The apparatus of claim 46, wherein said roller includes product gripping means on a peripheral surface thereof.

48. The apparatus of claim 46, including means mounting the roller at ends thereof and means for adjusting the relative spacing of the roller and blade.

49. The apparatus of claim 48, wherein said mounting means include guide means for guiding the end of the roller upon adjustment of the relative spacing.

50. The apparatus of claim 46, wherein said blade is sloped to cam products that are separated from the board, in an upward direction.

51. In a method of handling food products that are provided arranged on boards in which a plurality of the products are to be separated from the boards and subsequently arranged in a predetermined manner, the steps of:
   (a) transporting boards having a plurality of food products thereon that are arranged transverse of the longitudinal direction of product being transported, and in longitudinally serial rows of product, and serially conveying the boards longitudinally of the apparatus to a separation zone;
   (b) engaging a plurality of products transversely of the apparatus in a separation zone and separating the products from the boards within the zone;
   (c) receiving and transporting products from the separation zone, such that a plurality of products are arranged transverse of the direction of being transported and in longitudinally serial rows of product in the direction in which the products are being transported, and serially conveying transverse rows of product longitudinally; and
   (d) including the step of selectively re-orienting products between face-up and face-down positions;
   (e) wherein the step of selectively re-orienting products includes the steps of engaging all products in a transverse row and flipping those products from face-up to face-down positions or the converse; and
   (f) wherein the step of selectively re-orienting products includes the steps of engaging all products in a transverse row with a flipper and flipping those products from face-up to face-down positions or the converse; and conveying rows of products transverse to the longitudinal direction of product movement along a pair of transverse conveyors following the receiving and transporting step, and alternating a flipper to alternatively allow the rows of products being delivered following the receiving and transporting step, to be delivered onto the nearest one of a pair of transverse conveyors or to flip a row of products over the nearest one of the pair of transverse conveyors onto a more remote one of the pair of transverse conveyors.

52. The method of claim 51, wherein the engaging and separating of products from the boards includes the steps of engaging the products with a transverse roller and scraping the products from the board with a blade while the products are engaged by the roller.

53. The method of claim 52, wherein the engaging step includes gripping the products with a peripheral surface of the roller.

54. The method of claim 52, wherein the roller is provided mounted at its end, and including the step of adjusting the relative spacing of the roller and blade.

55. The method of claim 54, wherein the step of guiding the ends of the roller upon adjustment of the relative spacing.

56. The method of claim 52, including the step of camming products that are separated from the board in an upward direction over a sloped portion of the blade.

* * * * *